US008737630B2

(12) United States Patent
Chang et al.

(10) Patent No.: US 8,737,630 B2
(45) Date of Patent: May 27, 2014

(54) ACOUSTICAL MEASURING/ESTIMATION DEVICE

(75) Inventors: Joseph Sylvester Chang, College Station, TX (US); Chai Lung Lee, Singapore (SG)

(73) Assignee: Advanced Electroacoustics Private Limited, Singapore (SG)

( * ) Notice: Subject to any disclaimer, the term of this patent is extended or adjusted under 35 U.S.C. 154(b) by 527 days.

(21) Appl. No.: 12/971,653

(22) Filed: Dec. 17, 2010

(65) Prior Publication Data

US 2011/0103602 A1 May 5, 2011

Related U.S. Application Data

(63) Continuation-in-part of application No. PCT/US2009/047433, filed on Jun. 16, 2009.

(60) Provisional application No. 61/073,200, filed on Jun. 17, 2008.

(51) Int. Cl.
*H04R 29/00* (2006.01)

(52) U.S. Cl.
USPC .................................. 381/59; 381/56; 381/58

(58) Field of Classification Search
USPC ................... 381/56–59, 92, 122, 71.6, 74, 55
See application file for complete search history.

(56) References Cited

U.S. PATENT DOCUMENTS

| | | | | |
|---|---|---|---|---|
| 4,554,639 | A * | 11/1985 | Baker et al. | 702/1 |
| 5,577,511 | A * | 11/1996 | Killion | 600/559 |
| 6,275,592 | B1 | 8/2001 | Vartiainen | |
| 6,456,199 | B1 | 9/2002 | Michael | |
| 7,574,917 | B2 * | 8/2009 | Von Dach et al. | 73/646 |
| 7,836,770 | B2 * | 11/2010 | Goldberg et al. | 73/647 |
| 2007/0116302 | A1 * | 5/2007 | Kim et al. | 381/119 |
| 2007/0186656 | A1 | 8/2007 | Goldberg et al. | |
| 2008/0013744 | A1 * | 1/2008 | Von Dach et al. | 381/56 |
| 2008/0025525 | A1 | 1/2008 | Tsai | |
| 2008/0310645 | A1 * | 12/2008 | Itabashi et al. | 381/71.6 |
| 2009/0208024 | A1 | 8/2009 | Farver et al. | |
| 2010/0046767 | A1 | 2/2010 | Bayley et al. | |
| 2010/0278350 | A1 * | 11/2010 | Rung | 381/59 |

OTHER PUBLICATIONS

PCT International Preliminary Report on Patentability (IPRP) and Written Opinion dated Dec. 29, 2010, from the International Bureau, in related International Application No. PCT/US2009/047433 (6 pages).

* cited by examiner

*Primary Examiner* — Disler Paul
(74) *Attorney, Agent, or Firm* — Osha Liang LLP

(57) ABSTRACT

A device to measure or to estimate the acoustical output of the loudspeaker of a earphone, earplug, headphone or ear muff, and to measure the ambient environmental sounds where appropriate. The loudspeaker is connected to an electronic audio device. The acoustical output of the loudspeaker may be measured by means of a microphone placed in close proximity to the loudspeaker; or estimated by means of measuring the output of the audio amplifier (in the electronic audio device) and using the output/input transfer function that relates the acoustical output of the loudspeaker to the output of the audio amplifier; or estimated by means of the output the digital signal processor (in the electronic audio device) and using the output/input transfer function that relates the acoustical output of the loudspeaker to the output of the digital signal processor. The measurement or estimation of the acoustical output of the loudspeaker (and measurement of the ambient environmental noise, if appropriate) may be used to realize a noise dosimeter or as a means to determine the maximum allowable output limit of the electronic audio device.

8 Claims, 5 Drawing Sheets

ACOUSTICAL MEASURING/ESTIMATION DEVICE

CROSS-REFERENCE TO RELATED APPLICATIONS

This application is a Continuation-in-part of Application PCT/US2009/047433 filed on Jun. 16, 2009, which claims the benefit of U.S. Provisional Application 61/073,200 filed on Jun. 17, 2008. These prior applications are incorporated by reference in their entirety.

BACKGROUND OF INVENTION

1. Field of the Invention

This invention relates to an acoustical measurement or estimation device, and particularly to a means to measure or to estimate the acoustical output of a loudspeaker connected to an electronic audio device (and measures the environmental sounds where appropriate) to determine the noise dosage, and as a means to determine the maximum allowable limit for the acoustical output of the electronic audio device, for reducing the possibility of noise induced deafness.

2. Background Art

Many people listen to audio music and other sounds via earphones or headphones connected to an electronic audio device such as home hi-fi sets and portable electronic audio devices. In recent times, portable electronic audio devices such as dedicated MP3 players, including iPods manufactured by Apple Inc, and similar players in multifunctional devices such as cellular phones, have gained popularity. FIG. 1A depicts how a typical electronic audio device 1 is used. The output of electronic audio device 1 is connected to earphone 3 by wire 2. Earphone 3 has a loudspeaker within its casing and is usually placed in concha 5 of the user's pinna (ear) 4. FIG. 1B depicts another common earphone 9, also sometimes called a earbud-type earphone (also sometimes called a earplug earphone), where rubber insert 8 is placed into the ear canal of the user and the loudspeaker is embodied within earphone casing 7. The loudspeaker is connected to electronic audio device 1 via interconnecting cable 2. In general, earbud-type earphone 9 provides some (ambient environmental) noise isolation compared to the more common earphone 3. In some instances, a headphone is worn over the user's pinna 4 instead of earphone 3 placed in concha 5 or earphone 9 in the ear canal.

FIG. 2 depicts the block diagram of a typical electronic audio device 1, comprising memory 20 where the recordings of the music tracks or other audio recordings reside, digital signal processor 21, digital-to-analog converter 22 that converts the digital output of digital signal processor 21 to an analog form that is amplified by audio amplifier 23. The electrical signal from audio amplifier 23 is converted to acoustical output in loudspeaker 24. Loudspeaker 24 is usually encapsulated within earphone 3 or 9 or within a headphone cup.

In many instances, the users of such an electronic audio device 1 set the output of digital signal processor 21 and/or audio amplifier 23 therein to a high electronic signal level such that loudspeaker 24 in earphone 3 or 9 or headphone produces loud (high volume) sounds, more specifically high acoustical intensity outputs, or equivalently high sound pressure levels.

It is well established that a person exposed to loud sounds over extended periods will likely suffer from permanent hearing impairment, in particular noise induced deafness. In industry, the allowable noise exposure of workers in many countries is established by their respective industry safety bodies. For example, in USA, the Occupational Safety and Health Association (OSHA) has established the number of hours and the associated sound intensity levels a person may be safely exposed to—computed as a noise dosage (also known as the Permissible (Noise) Exposure Level) and is usually measured by means of a noise dosimeter 30 in FIG. 3. Dosimeter 30 typically comprises measuring microphone 34 connected by cable 33 to the electronics enclosed in casing 31. The noise dosage may be displayed in display 32.

In general, the noise dosage is computed such that the higher the intensity of sounds (noise) that a person is exposed to, the shorter is the duration allowed. For example, under USA Occupational noise exposure (1910.95) for hearing conservation, a person exposed to a noisy environment of 90 dBA (decibels, A-weighted) is allowed to work in that environment for 8 hours, while a person exposed to noisy environment of 95 dBA is allowed to work in that environment for considerably shorter—4 hours. In environments where the noise levels are 90 dBA or higher, the worker typically wears hearing protectors to reduce his noise exposure such that his noise dosage remains within the stipulated noise dosage standards, thereby allowing the worker to work safely and longer in such noisy environments. In some countries, the limits are more stringent, for example, in the European Union, the limit is 80 dBA for 8 hours. These safety standards established by OSHA and other similar bodies are usually well observed by industry at large in developed countries.

To determine the noise dosage of a worker, microphone 34 of dosimeter 30 is typically clipped around the shoulder area, and the noise dosage is computed for ambient environmental sounds near the worker's pinna, more specifically at the entrance of the ear canal. Such prior-art noise dosimeters, however, cannot be used to measure the noise dosage from the acoustical output of loudspeaker 24 connected to electronic audio device 1. This is due to the mechanical incompatibility, inconvenience and the inappropriateness of these prior-art dosimeters.

This lack of a personal noise dosimeter is unfortunate because when a person wears earphones 3 or 9 or headphones connected to electronic audio device 1, the acoustical music and other sounds produced by loudspeaker 24 in earphones 3 or 9 or headphone constitute to the overall noise exposure of that person donning earphone 3 or 9 or headphone. As in an industrial setting where the environmental noise intensity levels may be high, the sound intensity levels produced by loudspeaker 24 in the earphone 3 or 9 or headphone may also be high. The acoustical output of loudspeaker 24 depends largely on the level of the signal output of audio amplifier 23 in electronic audio device 1 driving loudspeaker 24, the spectrum of the output electronic signal of audio amplifier 23, and the sensitivity (acoustical efficiency) of loudspeaker 24.

In terms of safety to mitigate the possibility of noise induced deafness (for hearing conservation), the noise dosage standards established by OSHA and similar bodies, would similarly apply to a person exposed to acoustical levels from loudspeaker 24 in earphone 3 or 9 or headphone. However, the actual dosage due to exposure of the user of electronic audio device 1 is largely the responsibility of the user as the acoustical output of loudspeaker 24 is controlled by the user. To this end, most manufacturers of electronic audio device 1 include an advice, warning or a disclaimer, informing the user of their electronic audio device 1 that exposure to high intensity sounds may result in hearing impairment and that users are advised not to exposure themselves to high intensity sounds over extended periods.

In short, a personal noise dosimeter to determine or to estimate the acoustical output and the ensuing noise dosage arising from loudspeaker 24 largely does not exist. Further, a personal noise dosimeter to determine or to estimate the noise dosage (and/or acoustical output) arising from loudspeaker 24 and from the ambient environment largely does not exist.

To assist users from exposing themselves to excessive high intensity sounds from their electronic audio devices 1, some manufacturers include features to limit the maximum signal output in their electronic audio device 1 by means of limiting the maximum output (for example 120 dB to 100 dB, and by means of automatic level control), thereby limiting the acoustical output from loudspeaker 24. This prior-at approach, although generally useful but the problem of excessive noise exposure remains largely because the maximum output is dependent on the level recordings of the music, type of music and that different people perceive different loudness and the noise dosage remains largely unknown.

In an industrial setting, a hearing protector is worn to reduce the noise dosage of the user. Typically, the noise exposure of the user is estimated by subtracting the Noise Reduction Rating (NRR) of the hearing protector from the ambient noise level. However, it is well known that the actual noise isolation or reduction from the hearing protector is highly variable and/or often over-estimated as the hearing protectors may not be properly worn, worn-out, damaged, and/or of than less-than-ideal fit. In some cases, the user wears earphone 3 or 9 under the hearing protectors to listen to music from electronic audio device 1 or there may be loudspeaker 24 within a ear cup of the hearing protector (connected to an audio system); the hearing protector may be a ear muff type, eartip, earplug or earplug-type earphone 9. This would likely increase the noise exposure of the user because other than the ambient environmental sounds, there is the added acoustical output from electronic audio device 1 or from an audio system.

In US Patent 2009/0208024, a microphone is placed at the outside of the enclosure of an apparatus (headset comprising a earplug) to measure the environmental sounds and output of a loudspeaker within the enclosure. As the input port of the microphone is placed contralateral (opposite) to the ear canal (i.e. outside the earplug, facing the environment), the noise exposure at the ear canal is estimated by the microphone readings and using the acoustic leakage path. Specifically, the environmental sounds at the ear canal is estimated by a direct measurement of the environmental sound attenuated by the earplug, while the acoustical sounds from the loudspeaker at the ear canal is measured by the same microphone after attenuation by the earplug. The attenuation of both measurements is estimated by the acoustic leakage path. This estimation of sounds from the environment and from the loudspeaker is crude because the acoustic leakage path needs to be precise. A precise acoustic leakage path (model) is unrealistic because of the varying ear canal sizes, imprecise and varying (due to movement) fit of the ear plug and if a reasonable earplug fit is obtained, the measurement of the loudspeaker output would be severely masked by the environmental sounds. In short, the measurement from this prior art invention (and ensuing noise dosage) is a crude estimation of the sound intensity at the ear canal, and likely to be highly imprecise and probably unacceptable; the present invention will offer a novel approach to circumvent these limitations.

In US Patent 2010/0278350, the noise dosimeter is obtained by means of a microphone that is placed in a dome-like structure that is inserted in the ear canal. Although this prior-art invention does provide a more precise means of ascertaining the noise dosage than that described in US Patent 2009/0208024, the microphone within the dome-like structure is cumbersome, intrusive, difficult to wear (insert) and may be uncomfortable, in part because the varying sizes of different ear canals.

In short, there is a need to precisely determine, by means of measuring or by estimating, the noise dosage from electronic audio device 1 and the like to prevent noise induced deafness, and the measurement/estimation needs to be convenient (easy to wear), comfortable and non-intrustive. This need is very pressing because at the present time, many teenagers already suffer mild sensorineural hearing impairment from extended use of electronic audio device 1 that is often set at high sound intensities. Note that a sensorineural hearing impairment is largely irreversible, and in some cases, tinnitus results. If extended use of audio electronic device 1 continues, the hearing impairment of the users of electronic audio device 1 would likely deteriorate to more severe sensorineural hearing impairment if their noise dosage is not controlled.

Hence, it is highly desirable to have a device that can conveniently and precisely measure or estimate the acoustical output of loudspeaker 24 of a earphone 3 or 9 or headphone (and ambient environmental sounds where appropriate), unlike prior-art methods that are imprecise, cumbersome, etc. The measured or estimated acoustical output is useful in a number of ways, including simply as a means to inform the user of the acoustical sound intensity, for computation of the noise dosage (also providing information to the user of the remaining allowable noise dosage and duration of use of electronic audio device 1), and as a means to determine the limit to set the maximum output of electronic audio device 1 (and loudspeaker output). The overall advantage is to reduce the possibly of hearing impairment (noise induced deafness) due to excessive noise exposure that many users of electronic audio devices suffer from and are unaware of.

It is also highly desirable to have a device that is able to simultaneously (directly or indirectly) measure the acoustical output of loudspeaker 24 of earphone 3 or 9 or headphone and measure the ambient environmental sounds where appropriate, without imprecise and complicated leakage paths or that heavily attenuates the signal to the microphone. This device will provide a true (or at least more precise than prior-art methods) noise dosage of the user, including in the case of a hearing protector.

SUMMARY OF INVENTION

It is therefore the object of this invention to overcome the shortcomings stated above, and to provide an acoustical measurement or estimation device that can conveniently and precisely measure or estimate the acoustical output of a loudspeaker of a earphone or headphone connected to an electronic audio device, and where possible the ambient environmental noise, where the measurement or estimation may be used to compute the noise dosage or used as a means to determine the maximum allowable limit for the acoustical output of the loudspeaker of a earphone or headphone.

The present invention provides an acoustical measurement or estimation device to conveniently and precisely measure or estimate the acoustical output of loudspeaker 24 of earphone 3 or 9 or headphone connected to electronic audio device 1. The measurement is obtained by means of microphone 52, being placed in close proximity to loudspeaker 24, which measures the acoustical output of loudspeaker 24 (and environmental sounds) near the ear canal of the user of electronic audio device 1. The precise estimation is obtained by one of two methods. One estimation method involves measuring the electrical output of electronic audio device 1 and using the output/input transfer function that relates the acoustical output of loudspeaker 24 and the electrical output of electronic audio device 1. Another estimation method involves the output signal level of digital signal processor 21 and using the output/input transfer function that relates the acoustical output of loudspeaker 24 and the output of digital signal processor 21. The measured or estimated acoustical output of loudspeaker 24 and/or the ambient environment (sounds) may be used to determine the noise dosage of the user or may be used to determine the maximum allowable limit for the acoustical output of loudspeaker 24.

Other aspects and advantages of the invention will be apparent from the following description and the appended claims.

DETAILED DESCRIPTION

The present invention is a precise acoustical measuring or estimation device that provides a means to measure or estimate the acoustical output of loudspeaker 24 of a earphone 3 or 9 or headphone connected to an electronic audio device 1 and in some applications, the ambient environmental noise, thereby realizing a personal dosimeter and/or as a means to determine the maximum limit allowable for the acoustical output of loudspeaker 24. This limit can be set by digital signal processor 21 or other means.

Figure 1A:
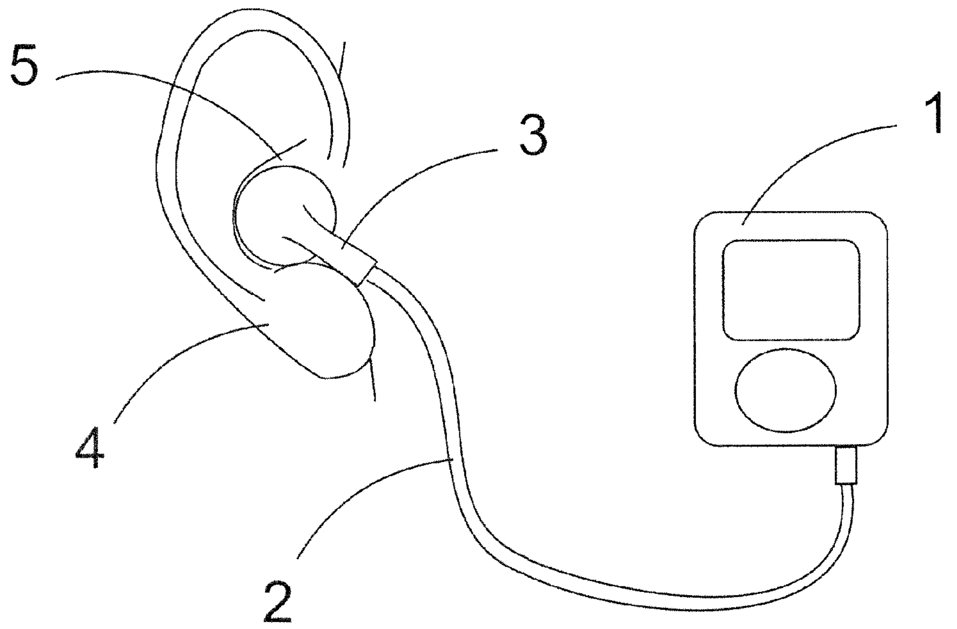
FIG. 1A (Prior Art) is a diagram of an electronic audio device, for example an MP3 player, with the earphone worn within the concha of a user.
Figure 1B:
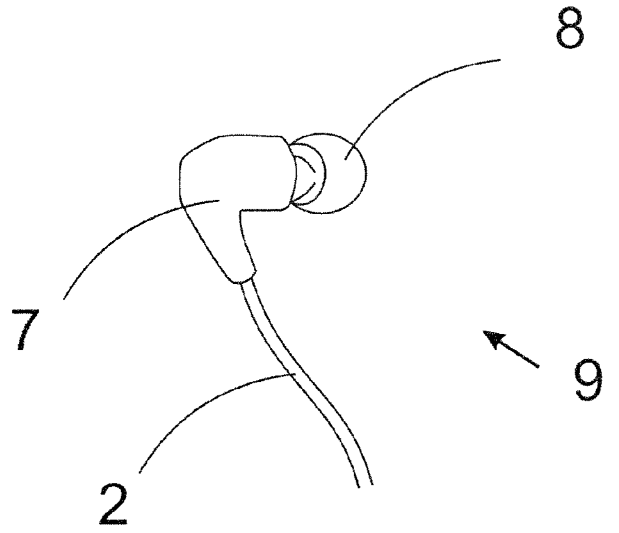
FIG. 1B (Prior Art) is a diagram of a earbud earphone with a noise isolating ear insert.
Figure 2:
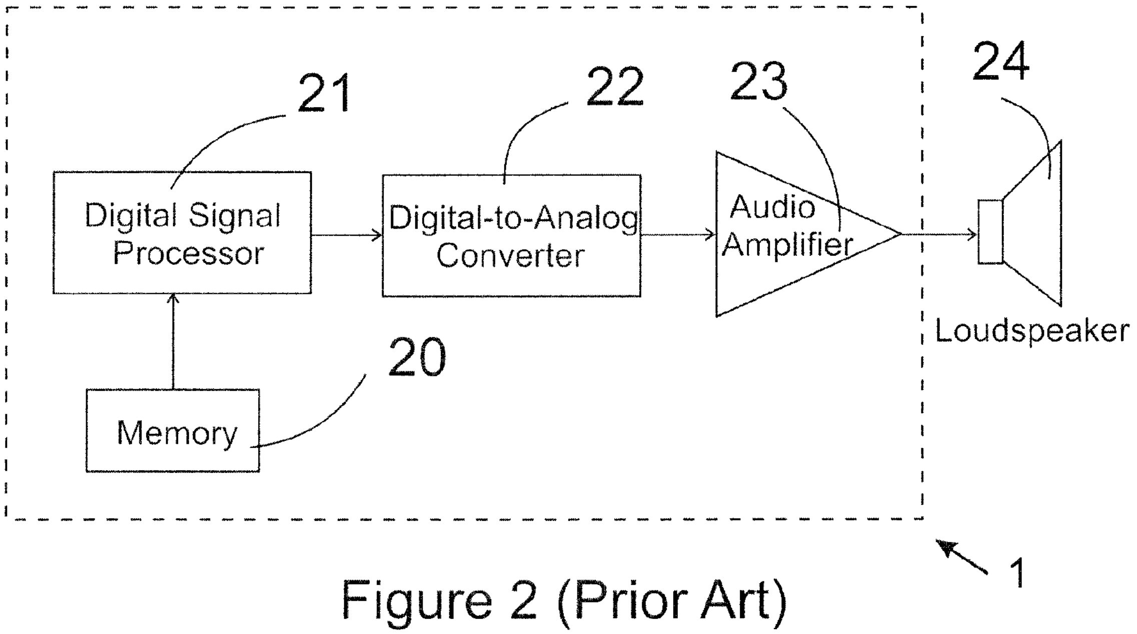
FIG. 2 (Prior Art) is a diagram illustrating the block diagram of a typical electronic audio device with the interconnecting loudspeaker within the earphone.
Figure 3:
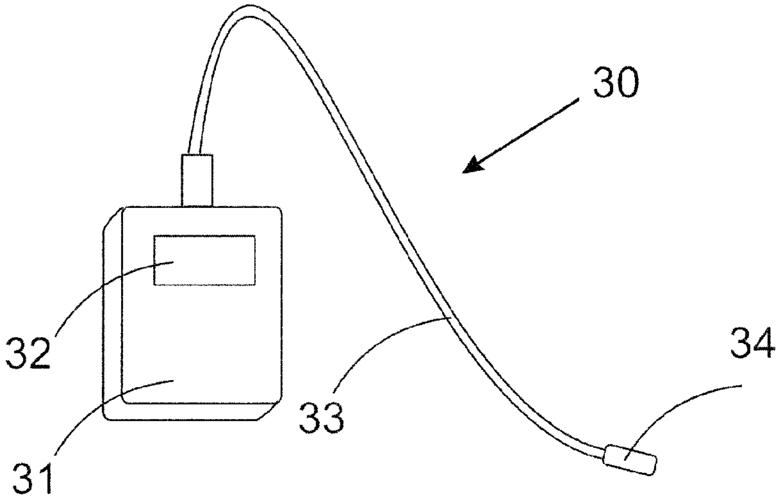
FIG. 3 (Prior Art) is a diagram of a sound/noise dosimeter available commercially.
Figure 4:
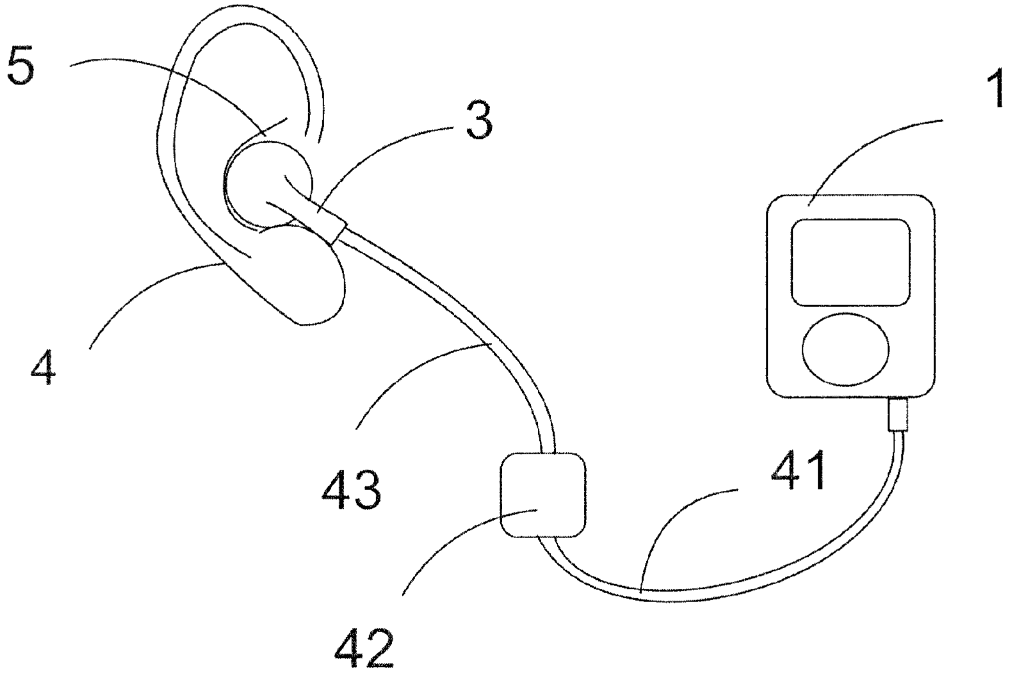
FIG. 4 is a diagram illustrating an electronic device embodying the present invention that is placed between the electronic audio device and the earphone.

FIG. 4 depicts an embodiment of the present invention, a personal dosimeter 42, where the acoustical output of loudspeaker 24 in earphone 3 or 9 or headphone is measured (as opposed to estimated) to determine the noise dosage arising from the acoustical output of loudspeaker 24 or to determine the maximum limit allowable for loudspeaker 24. Personal dosimeter 42 is an electronic device that is connected to electronic audio device 1 via cable 41 and to earphone 3 or 9 or headphone via cable 43.

Figure 5:
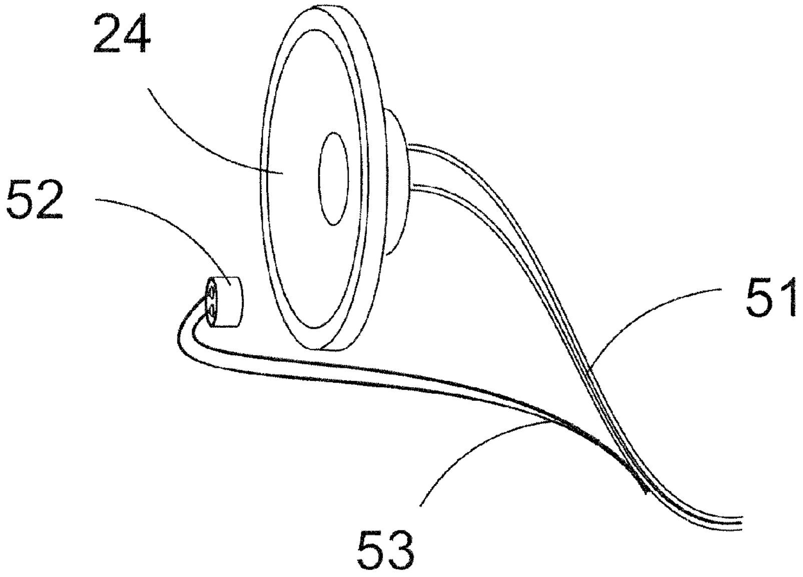
FIG. 5 is a diagram illustrating an embodiment of the present invention where the microphone is placed in close proximity to the loudspeaker, both usually within the casing of a earphone or headphone, the loudspeaker connected to an electronic audio device, and the microphone connected to the electronic device measures the acoustical output of the loudspeaker.

FIG. 5 depicts part of one part of the embodiment of the invention where earphone 3 or 9 or headphone comprises loudspeaker 24 and further, microphone 52. Cable 43 comprises both wires 51 that connects loudspeaker 24 to the output of audio amplifier 23 of electronic audio device 1 (via personal dosimeter 42), and wires 53 that connects microphone 52 to personal dosimeter 42. Notice that the microphone is placed near or in front of the loudspeaker—a direct measurement—and would be near or at the entrance of the ear canal when the earphone, headphone or ear muff is worn. This is largely consistent with the definition for the measurement of noise dosage—sound at the approximate entrance of the ear canal. In FIG. 5, if there is insufficient space to place microphone 52 in front of loudspeaker 24, microphone 52 may be placed elsewhere nearby. If microphone 52 is placed far away, the input port of microphone 52 may be piped to a space near the front of loudspeaker 24 by means of an acoustic pipe (with known acoustic characteristics)—that is, one end of the acoustic pipe is connected to the input port of the microphone while the other end of the acoustic pipe is placed near the loudspeaker. The position of the microphone input port or one end of the acoustic pipe circumvents the impreciseness of measurements arising from inappropriate placement of the microphone of an aforesaid prior-art invention.

Note that in FIG. 5, microphone 52 would not only measure the acoustical output of loudspeaker 24 but also the ambient environmental sounds at its input port. In other words, the noise dosage measured by personal dosimeter 42 is the true noise dosage of the user (instead of just the acoustical output of loudspeaker 24). In this embodiment, as microphone 52 or acoustic pipe is preferably placed in front of the ear canal when the earphone 3 or 9 or headphone is worn, the measurement of the environmental sounds for the computation of noise dosage will be precise (unlike a prior-art invention which may involve imprecise acoustic leakage paths). The measured noise dosage may also be used to determine the maximum limit allowable for the acoustical output of loudspeaker 24. In most cases, microphone 52 is placed at close proximity to loudspeaker 24, preferably with the input port of the microphone facing loudspeaker 24, and both transducers are typically enclosed within the same earphone 3 or 9 or headphone enclosure; usual prior-art earphones comprise loudspeaker 24 only.

Figure 6:
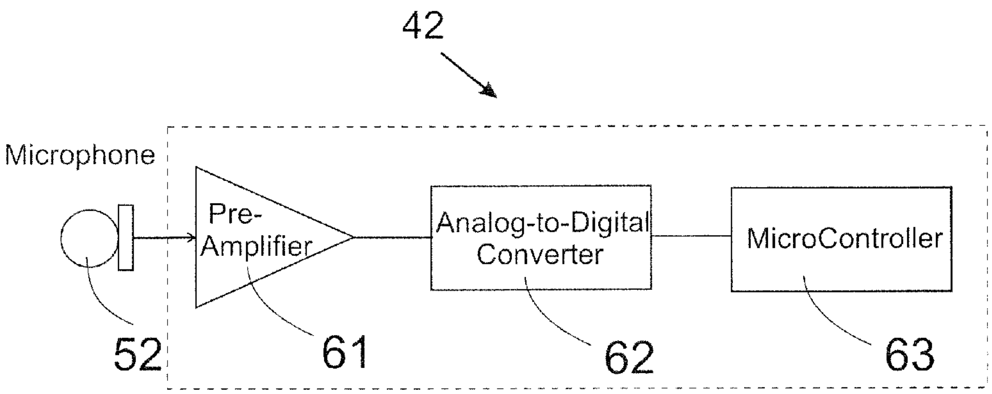
FIG. 6 is a diagram illustrating the electronic functional blocks of the acoustic measurement device embodying the invention.

FIG. 6 depicts the block diagram of the embodiment of the present invention—the personal dosimeter 42. Microphone 52 picks up the acoustical output of loudspeaker 24 (and environmental sounds). The analog electrical output of microphone 52 is amplified by pre-amplifier 61 and the signal is thereafter converted to a digital signal by an analog-to-digital converter 62. The digital signal is finally used as the input for the computation of the equivalent sound pressure level over time $L_{Aeq,T}$ by the microcontroller 63. The computation of $L_{Aeq,T}$ is well known:

$$L_{Aeq,T} = 10\log\left[\sum_{i=1}^{n} \frac{t_i}{T} \times 10^{\frac{L_i}{10}}\right]$$

where $L_{Aeq,T}$ is the equivalent sound pressure level over time period T, in dBA, and $L_i$ is the sound level in dBA during the interval $t_i$.

In the prevailing USA occupational noise standards (1910.95), the permissible noise dosage $L_{Aeq,T}$ is 90 dBA for T=8 hours. Microcontroller 63 may display the overall noise dosage visually (a digital display or LEDs) or acoustically to inform the user (see later). The computation by microcontroller 63 may also be used to set the maximum allowable output of loudspeaker 24 (by limiting the maximum output of digital signal processor 21 (or other means)) connected to electronic audio device 1.

Figure 7:
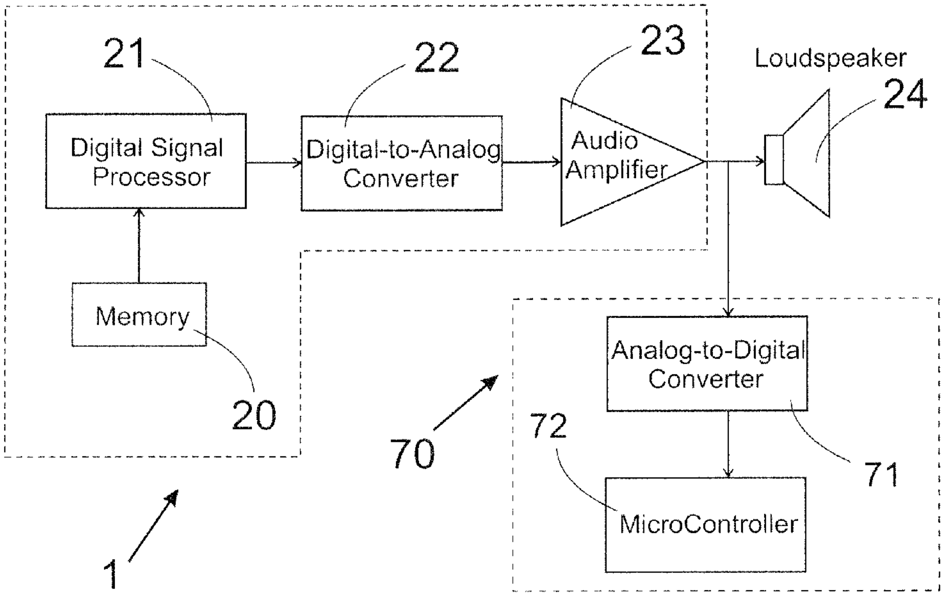
FIG. 7 is a diagram illustrating a preferred embodiment of the present invention where the acoustical output of the loudspeaker of a earphone or headphone is estimated by measuring the electrical signal of the output of the electronic audio device and by using the output/input transfer function that relates the acoustical output of the loudspeaker and output electrical signal of the electronic audio device.

FIG. 7 depicts a preferred embodiment of the present invention, a personal dosimeter 42, where the acoustical output of loudspeaker 24 is estimated (as opposed to measured) to estimate the noise dosage arising from the acoustical output of loudspeaker 24. In this preferred embodiment, microphone 52 is not required and this would reduce the cost of manufacture. Instead, the output of audio amplifier 23 is sampled by analog-to-digital converter 71. The output of analog-to-digital converter 71 is input to microcontroller 72. The output/input transfer function that relates the acoustical output of loudspeaker 24 and the output of the electronic audio device (in this case, audio amplifier 23 (also the input to loudspeaker 24)) is known—the different loudspeakers from various earphone and headphone manufacturers would be measured to determine their transfer function characteristics. From the known acoustical output/electrical input transfer function of loudspeaker 24, the acoustical output of loudspeaker 24 can be estimated from the measurement of the output of audio amplifier 23. Finally, the estimated $L_{Aeq,T}$ given above can be computed by microcontroller 72. The computation by microcontroller 72 may also be used to set the maximum allowable output of loudspeaker 24 connected to electronic audio device 1. Note that this estimation is precise because the acoustical output/electrical input transfer function of loudspeaker 24 can be precisely determined from standardized measurements from an acoustical manikin.

Figure 8:
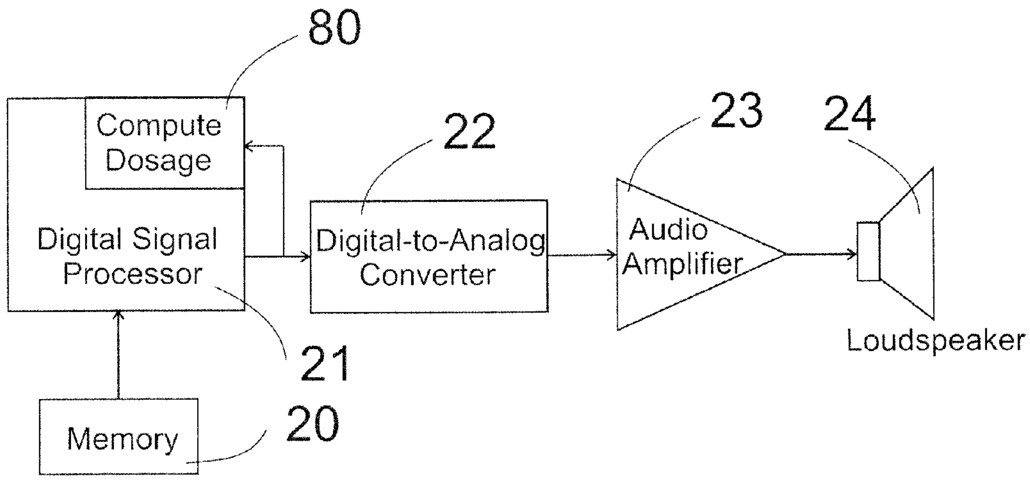
FIG. 8 is a diagram illustrating the further preferred embodiment of the present invention where the acoustical output of the loudspeaker of a earphone or headphone is estimated from the output digital signal of the digital signal processor in an electronic device and using the transfer function that relates the acoustical output of the loudspeaker and output of the digital signal processor.

FIG. 8 depicts a further preferred embodiment of the present invention where the functionality of the personal dosimeter 42 is now embedded in electronic audio device 1 that in turn may be embodied in a larger electronic device, for example an MP3 player in a cellular phone. In this further preferred embodiment, no additional hardware is required as digital signal processor 21, in addition to its other functions, is used to compute the estimated $L_{Aeq,T}$. The following transfer function characteristics are known for a given electronic audio device 1: the acoustical output/electrical input transfer function of loudspeaker 24 (whose input is electrical output of the electronic audio device (e.g. audio amplifier 23)), the electrical output/input transfer function of the audio amplifier 23 (whose input is output of digital-to-analog converter 22), and the electrical output/input characteristics of the digital-to-analog converter 22 (whose input is output of digital signal processor 21)—collectively the output/input transfer function characteristics of the acoustical output of loudspeaker 24 from the output of the digital signal processor 21. From these known transfer function characteristics, the acoustical output of loudspeaker 24 can be precisely estimated from the output of digital signal processor 21. The estimated acoustical output of loudspeaker 24 is used to compute estimated $L_{Aeq,T}$ in Dosage Computation 80 in digital signal processor 21 of electronic audio device 1. The computation by Dosage Computation 80 in digital signal processor 21 may also be used to set the maximum allowable output of loudspeaker 24. As in the preferred embodiment of the present invention, this estimation in this further preferred embodiment is likewise precise because the acoustical output/electrical input transfer function of loudspeaker 24 can be precisely determined from standardized measurements from an acoustical manikin.

Figure 9:
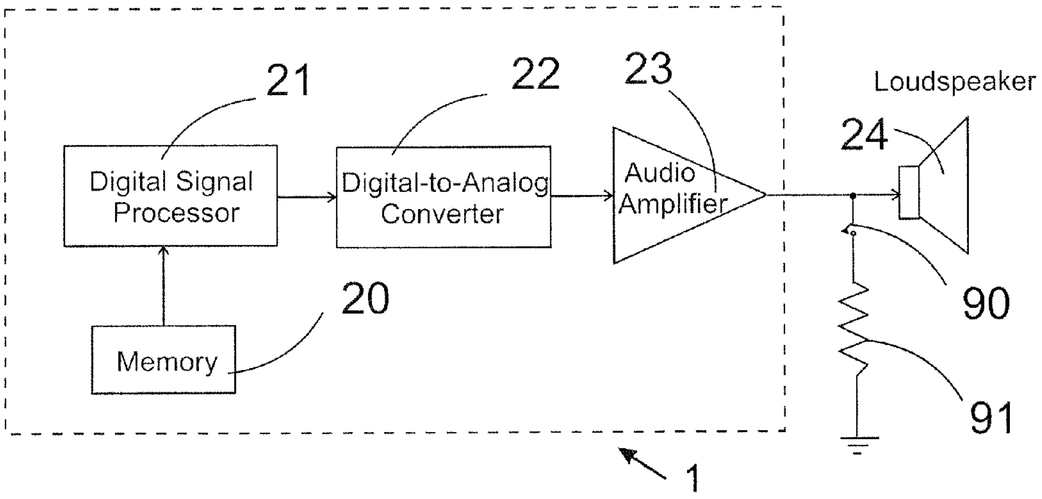
FIG. 9 is a diagram illustrating yet a further embodiment of the present invention where the acoustical output of the loudspeaker may be interrupted by changing the load of the audio amplifier, thereby providing an acoustical means to inform the user of the audio electronic device that a specified noise dosage has been reached or exceeded.

An important practical aspect of the present invention, an acoustical measurement or estimation device, is how the user can be informed of his noise exposure and dosage. To do this, the three aforementioned embodiments of the invention could embody one or several methods to inform the user when a given noise dosage arising from the acoustical output of loudspeaker 24 (and from ambient environmental sounds in the first embodiment) is reached or exceeded. FIG. 9 depicts one simple acoustical method that is hardware efficient. An additional load resistor 91 may be connected in parallel to loudspeaker 24 via switch 90. When the noise dosage is below a specified level, switch 90 is open, resistor 91 is disconnected and the electronic audio device 1 operates as normal (that is, audio amplifier 23 is without any additional load). However, when the noise dosage reaches or exceeds a preset noise dosage, switch 90 is toggled on and off periodically for a specified time period, and the acoustical output of loudspeaker 24 is perceptually softer and louder accordingly. In this fashion, the user is acoustically informed that a given noise dosage has been reached or exceeded.

Alternatively, another simple acoustical method is to simply disconnect loudspeaker 24 from audio amplifier 23 and/or disable audio amplifier 23 when the noise dosage reaches or exceeds a preset noise dosage. Also, the user may be informed acoustically if digital signal processor 21 in FIG. 8 outputs a message with the desired information. In addition, digital signal processor 21 could continuously reduce the amplitude of its output when the noise dosage reaches or exceeds a preset noise dosage.

Yet alternatively, a visual display (by LEDs or a small display) in personal dosimeter 42 or in the electronic audio device 1 can display and/or augment the information provided to the user.

In FIGS. 7-9, the digital-to-analog converter 22 and audio amplifier 23 may be replaced by a switching amplifier, for example a digital Class D amplifier that performs the simultaneous function of a digital-to-analog converter and an amplifier.

It should be understood to those skilled in the art that although the preferred embodiments have been shown here as a way of teaching the best way to make and use the invention, various modifications can be made to fit the needs or preferences of the user or the manufacturer. For example, instead of using the acoustical notification methodology in FIG. 9, digital signal processor 21 may output more meaningful signals, for example speech including the estimated noise dosage. Further, there may be various earphone, earplug and headphone designs, various hearing protectors including earplug types, hearing aids and active noise reduction devices that may encompass one or more of the invention embodiments herein. Yet further, instead of the digital-to-analog converter and the audio amplifier in the electronic audio device, the digital-to-analog converter and the audio amplifier may be replaced by a digital Class D amplifier. Having described the above embodiments with reference to the accompanying drawings, it is to be understood that the invention is not limited to these embodiments and that various changes and modifications can be made by one skilled in the art without departing from the spirit and scope of the novel concepts of the invention as defined in the appended claims.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCES

Neils Farver and Mads Rugholm, "Apparatus for Reducing the Risk of Nose Induced Hearing Loss." U.S. Patent No. US2009/0208024, issued Aug. 20, 2009.

Martin Rung, "Headset System Comprising a Noise Dosimeter," U.S. Patent N. US 2010/0278350, issued Nov. 4, 2010.

What is claimed is:

1. An acoustical estimation device for obtaining an estimation of an acoustical output of at least one loudspeaker, wherein said at least one loudspeaker is connected to at least one electronic audio device having an electronic output, said acoustical estimation device comprises an analog-to-digital converter and a microcontroller that sample said electronic output of said at least one electronic audio device, and said estimation of said acoustical output of said at least one loudspeaker is processed to determine an estimated noise dosage arising from said acoustical output of said at least one loudspeaker, and is obtained from said sampled electronic output of said at least one electronic audio device, and using a transfer function that relates said acoustical output of said at least one loudspeaker and said sampled electronic output of said at least one electronic audio device.

2. An acoustical estimation device as recited in claim 1, wherein said at least one electronic audio device comprises at least one audio amplifier having an electronic output, said at least one loudspeaker is connected to said at least one audio amplifier, and said transfer function is equivalent to a transfer function that relates said acoustical output of said at least one loudspeaker and said electronic output of said at least one audio amplifier.

3. An acoustical estimation device as recited in claim 1, wherein said estimation of said acoustical output of said at least one loudspeaker is used to determine or limit the maximum allowable acoustical output of said at least one loudspeaker.

4. An acoustical estimation device as recited in claim 1, wherein the user of said at least one electronic audio device is notified when at least one predetermined noise dosage is reached.

5. An electronic device that comprises at least one electronic audio device and at least one acoustical estimation device, wherein at least one loudspeaker is connected to said at least one electronic audio device, and having an acoustical output, said at least one electronic audio device comprises at least one digital signal processor, at least one digital-to-analog converter and at least one audio amplifier, said at least one digital signal processor having an electronic output, said at least one digital-to-analog converter having an electronic output, said at least one audio amplifier having an electronic output, said at least one acoustical estimation device employs said at least one digital signal processor to obtain an estimation of said acoustical output of said at least one loudspeaker, and said estimation of said acoustical output of said at least one loudspeaker is processed to determine an estimated noise dosage arising from said acoustical output of said at least one loudspeaker, and is obtained from either said electronic output of said at least one digital signal processor, and from a transfer function that relates said acoustical output of said at least one loudspeaker and said electronic output of said at least one digital signal processor, or said electronic output of said at least one digital-to-analog converter, and from a transfer function that relates said acoustical output of said at least one loudspeaker and said electronic output of said at least one digital-to-analog converter, or said electronic output of said at least one audio amplifier, and from a transfer function that relates said acoustical output of said at least one loudspeaker and said electronic output of said at least one audio amplifier.

6. An electronic device as recited in claim 5, wherein said at least one audio amplifier is a switching amplifier that comprises the functionality of digital to analog conversion of said at least one digital-to-analog converter, and audio amplification of said at least one audio amplifier.

7. An electronic device as recited in claim 5, wherein said estimation of said acoustical output of said at least one loudspeaker is used to determine or limit the maximum allowable acoustical output of said at least one loudspeaker.

8. An electronic device as recited in claim 5, wherein the user of said at least one electronic audio device is notified when at least one predetermined noise dosage is reached.

* * * * *